United States Patent
Ishida et al.

(10) Patent No.: US 12,460,454 B2
(45) Date of Patent: Nov. 4, 2025

(54) VEHICLE DOOR OPENING DEVICE

(71) Applicants: AISIN CORPORATION, Kariya (JP); TOYOTA JIDOSHA KABUSHIKI KAISHA, Toyota (JP)

(72) Inventors: Naoya Ishida, Kariya (JP); Eiji Itami, Kariya (JP); Hideyuki Kanie, Kariya (JP); Yasuhiro Ishikawa, Okazaki (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 238 days.

(21) Appl. No.: 17/822,938

(22) Filed: Aug. 29, 2022

(65) Prior Publication Data

US 2023/0067874 A1  Mar. 2, 2023

(30) Foreign Application Priority Data

Aug. 31, 2021 (JP) .................. 2021-140686

(51) Int. Cl.
*E05B 81/58* (2014.01)
*B60R 25/01* (2013.01)
*E05B 81/76* (2014.01)

(52) U.S. Cl.
CPC .............. *E05B 81/58* (2013.01); *B60R 25/01* (2013.01); *E05B 81/77* (2013.01)

(58) Field of Classification Search
CPC ......... E05B 81/58; E05B 81/77; B60R 25/01; B60R 25/24
See application file for complete search history.

(56) References Cited

U.S. PATENT DOCUMENTS

| 6,034,617 A * | 3/2000 | Luebke .............. G07C 9/00309 340/5.63 |
| 9,467,817 B1 * | 10/2016 | Van Wiemeersch .... H04W 4/40 |
| 11,230,258 B2 * | 1/2022 | Keutgen ............ G07C 9/00309 |
| 2004/0160126 A1 * | 8/2004 | Aoki ....................... E05B 83/40 307/10.2 |

(Continued)

FOREIGN PATENT DOCUMENTS

| JP | 2015-190115 A | 11/2015 |
| JP | 2020-94410 A | 6/2020 |
| JP | 2021-85292 A | 6/2021 |

*Primary Examiner* — Dale W Hilgendorf
*Assistant Examiner* — Frank T Glenn, III
(74) *Attorney, Agent, or Firm* — Oblon, McClelland, Maier & Neustadt, L.L.P.

(57) ABSTRACT

A vehicle door opening device includes a lock control device configured to switch a door lock device to an unlocked state when an operation on a first operation member is detected, and a latch control device configured to: when an operation on a second operation member is detected while the door lock device is in the unlocked state, switch the latch mechanism to an unlatched state; when the operation on the second operation member is detected while the door lock device is in a locked state and when the operation on the first operation member is detected, switch the latch mechanism to the unlatched state; and, when the operation on the second operation member is detected while the door lock device is in the locked state and when the operation on the first operation member is not detected, maintain the latch mechanism in a latched state.

4 Claims, 5 Drawing Sheets

(56) References Cited

U.S. PATENT DOCUMENTS

| | | | |
|---|---|---|---|
| 2004/0177478 A1* | 9/2004 | Louvel | E05B 79/06 |
| | | | 16/430 |
| 2006/0279402 A1* | 12/2006 | Okamitsu | B60R 25/04 |
| | | | 340/5.72 |
| 2014/0347164 A1* | 11/2014 | De Wind | B60Q 1/2669 |
| | | | 340/5.72 |
| 2015/0052958 A1* | 2/2015 | Pericak | E05B 81/04 |
| | | | 70/263 |
| 2015/0314756 A1* | 11/2015 | Moenig | B60R 25/24 |
| | | | 340/5.61 |
| 2016/0362916 A1* | 12/2016 | Tomaszewski | E05B 81/06 |
| 2017/0022742 A1 | 1/2017 | Seki et al. | |
| 2018/0056937 A1* | 3/2018 | Pflug | B60R 25/24 |
| 2019/0048645 A1* | 2/2019 | Nakatomi | E05B 81/76 |
| 2020/0032560 A1* | 1/2020 | Rivaya | E05B 81/77 |
| 2020/0190871 A1 | 6/2020 | Takato | |
| 2021/0164274 A1 | 6/2021 | Tanino et al. | |

* cited by examiner

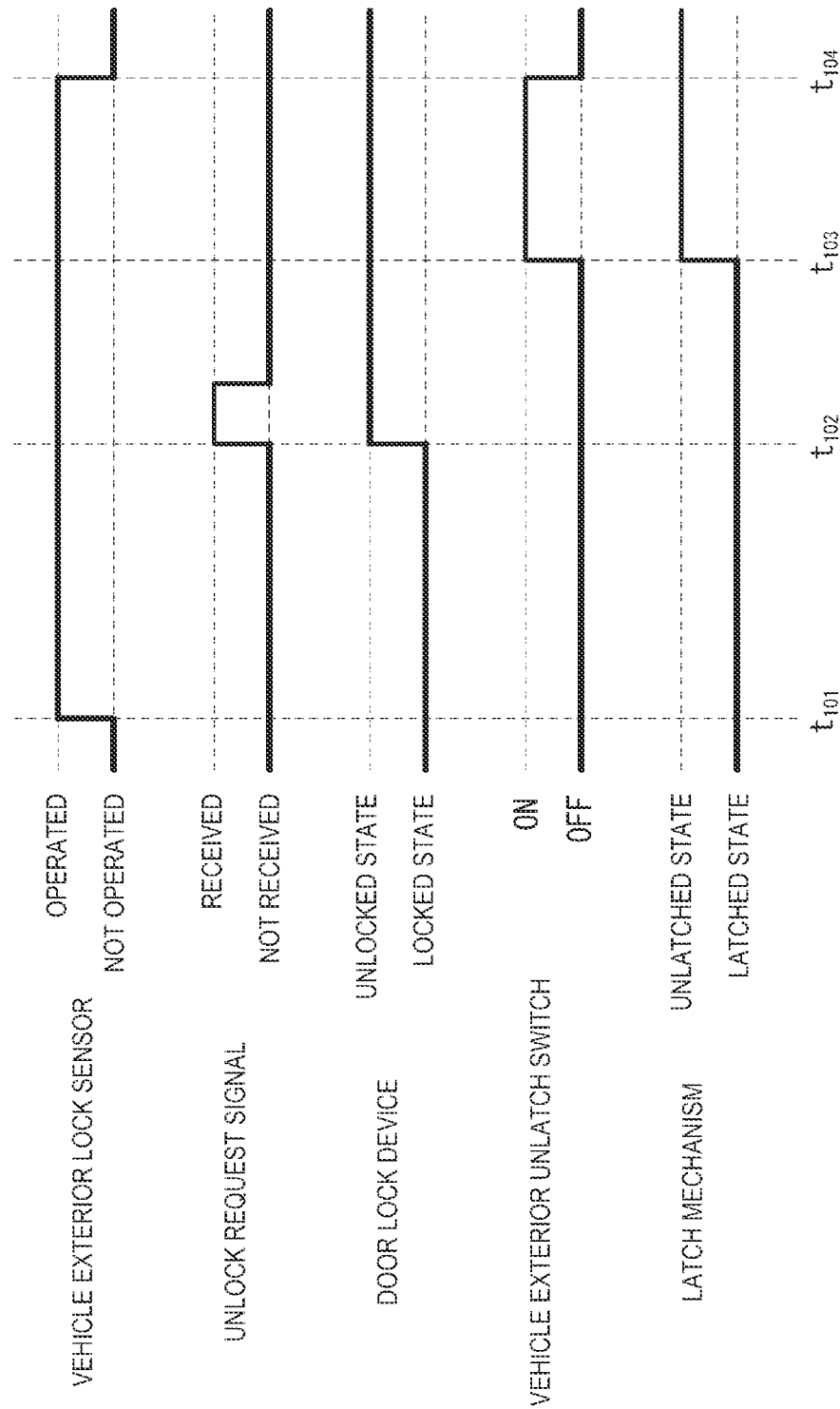

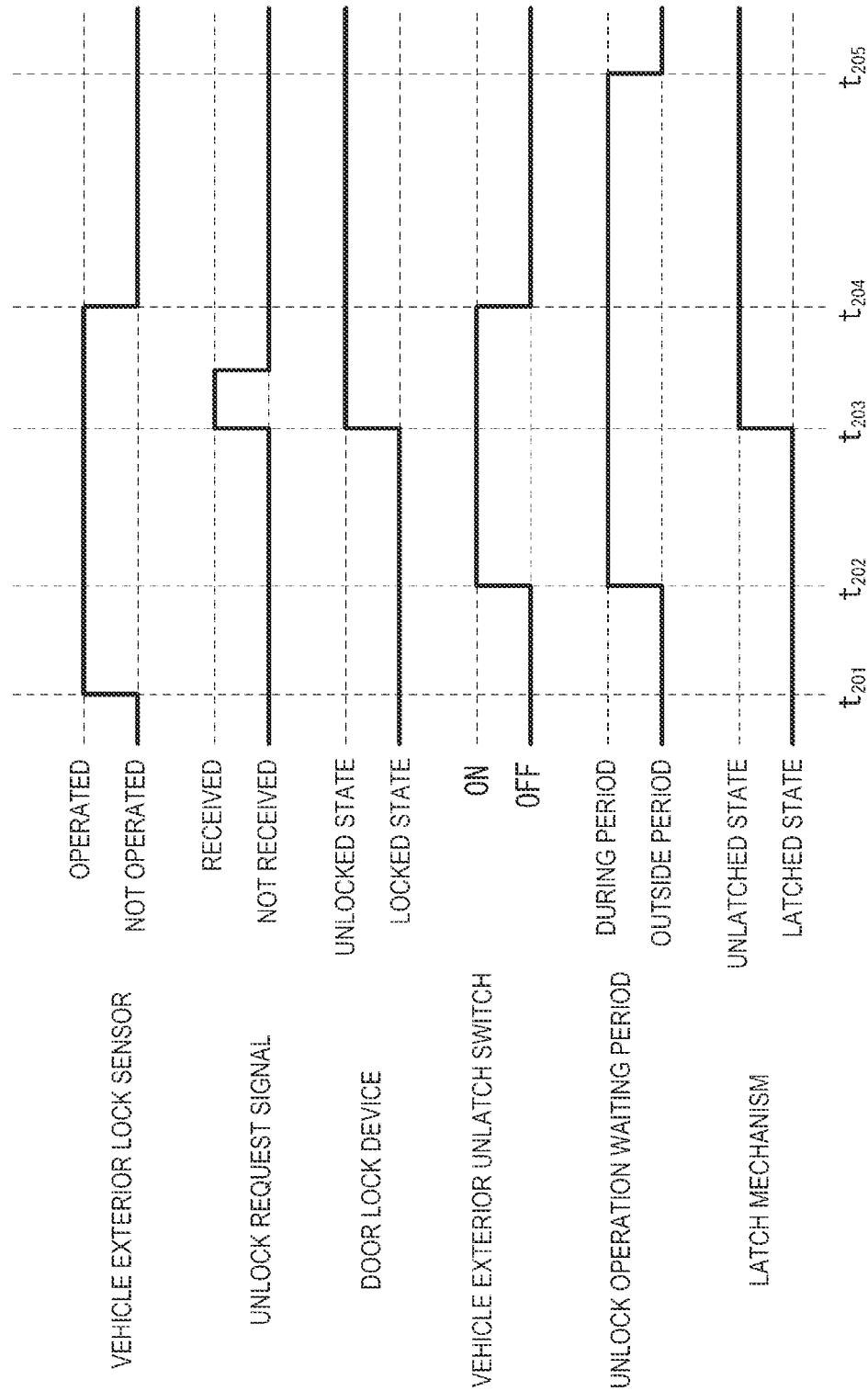

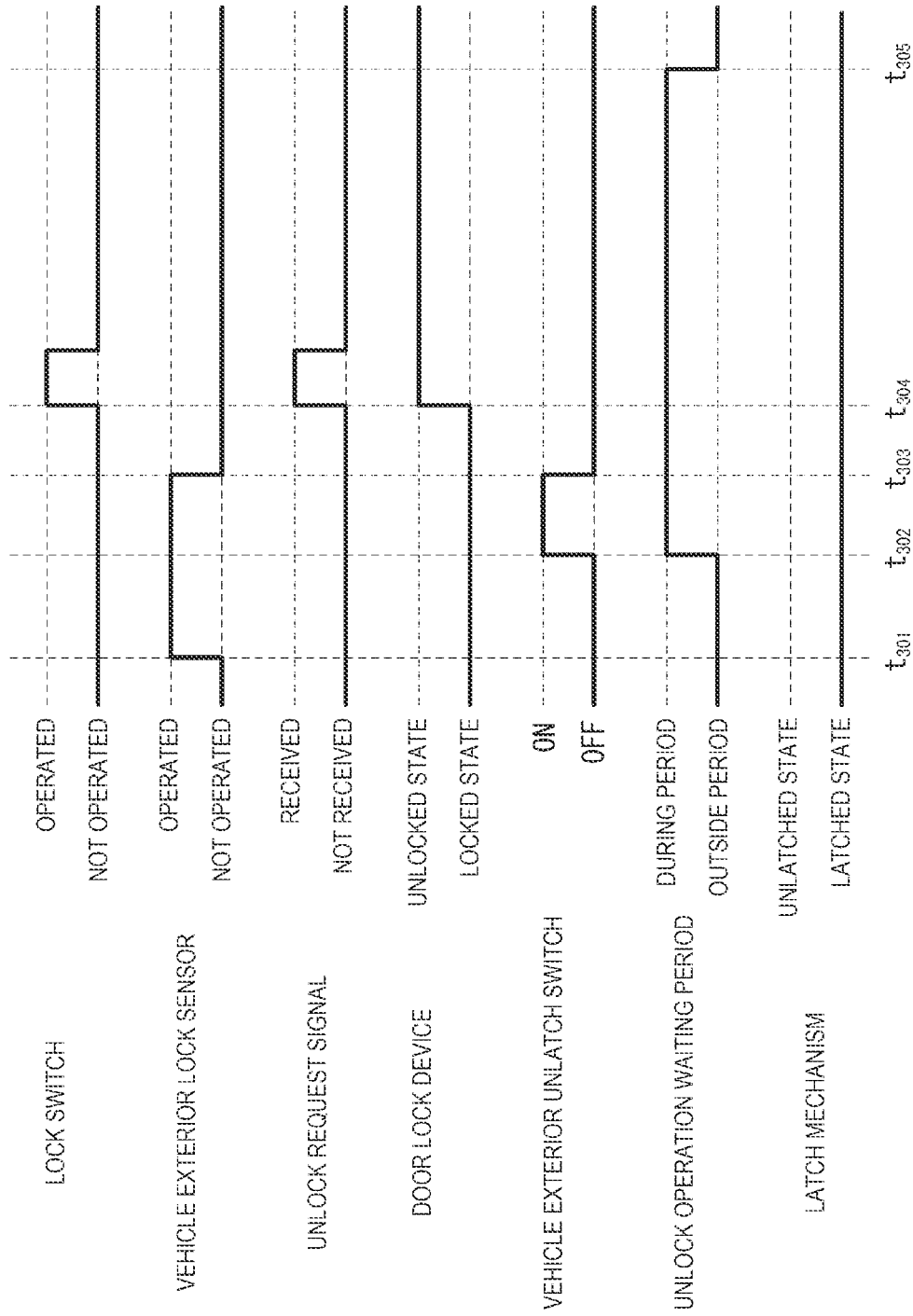

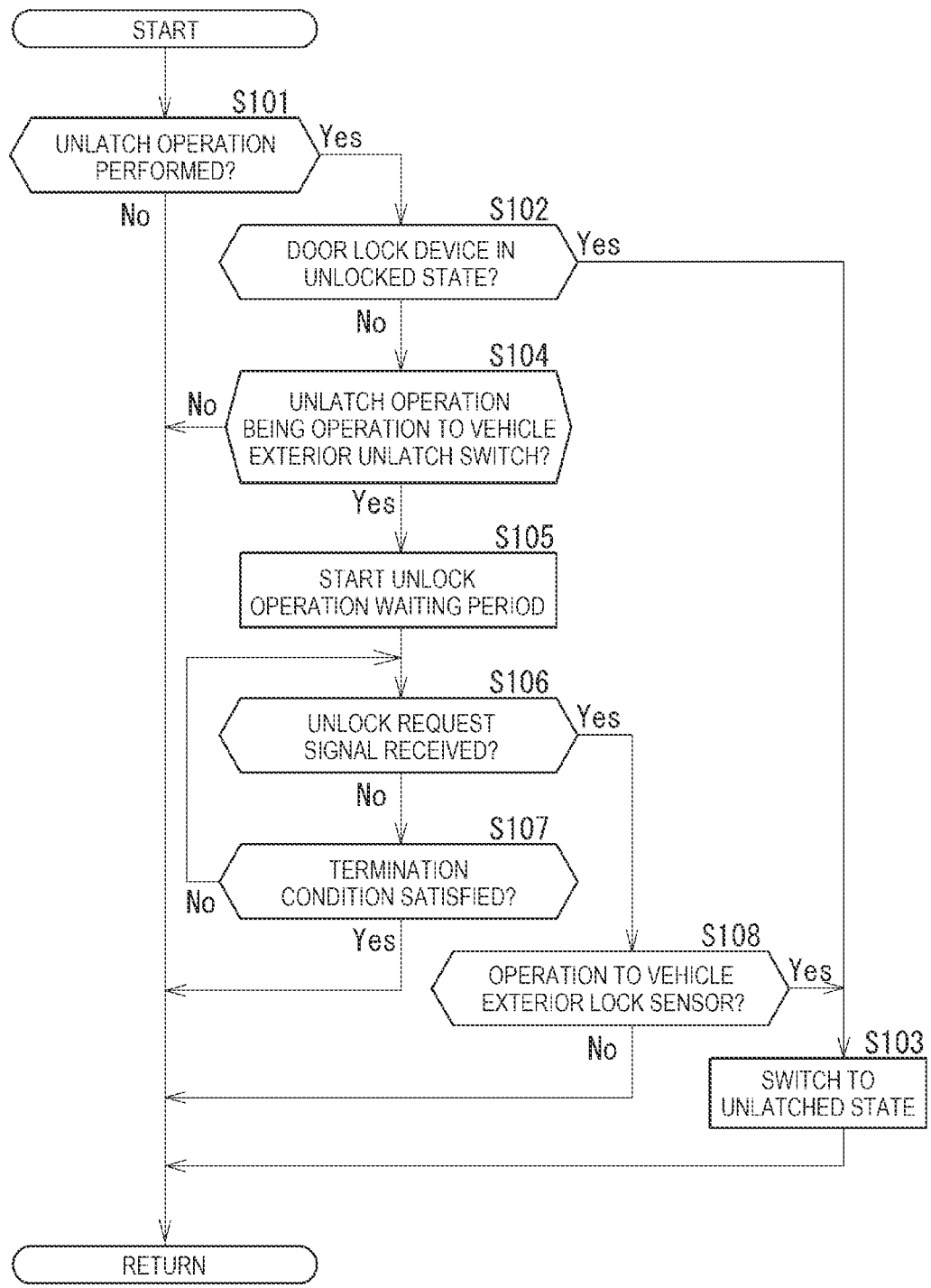

VEHICLE DOOR OPENING DEVICE

CROSS REFERENCE TO RELATED APPLICATIONS

This application is based on and claims priority under 35 U.S.C. § 119 to Japanese Patent Application 2021-140686, filed on Aug. 31, 2021, the entire content of which is incorporated herein by reference.

TECHNICAL FIELD

This disclosure relates to a vehicle door opening device.

BACKGROUND DISCUSSION

In the related art, there is known a door lock device capable of performing switching between a locked state and an unlocked state and switching from a latched state to an unlatched state by a driving force of an actuator. A vehicle door opening device that controls such a door lock device drives an actuator in accordance with a detected operation when an operation on a sensor and/or a switch is detected.

JP 2020-94410A (Reference 1) discloses a door handle that can be applied to a door opening device as described above. Specifically, the door handle disclosed in Reference 1 includes a handle grip, an unlatch lever that is swingable with respect to the handle grip, a lock sensor plate provided on the unlatch lever, and an opening and closing switch that is switched between ON and OFF by swinging of the unlatch lever with respect to the handle grip. The door opening device to which the door handle disclosed in Reference 1 is applied can be configured to switch the door lock device from the locked state to the unlocked state when a touch operation on the lock sensor plate is detected, and to switch a latch mechanism from the latched state to the unlatched state when the switch between ON and OFF of the opening and closing switch is detected.

When operating the door handle described in Reference 1, a user first hooks a finger on the unlatch lever, and then pulls the handle grip together with the unlatch lever. For this reason, first, the finger of the user comes into contact with the lock sensor plate provided on the unlatch lever, and then the opening and closing switch is switched between ON and OFF by the swinging of the unlatch lever. Accordingly, the door lock device is switched from the locked state to the unlatched state by the operation of the user, and then the latch mechanism of the door lock device is switched from the latched state to the unlatched state.

However, when a time from when the user touches the lock sensor plate provided on the unlatch lever to when the user swings the unlatch lever (pulls the handle grip) is short, the door opening device may detect that the unlatch switch is switched between ON and OFF at a time point before the door lock device is switched from the locked state to the unlocked state by detecting contact of the finger or the like of the user with the lock sensor plate. In this case, since the door lock device is not switched to the unlocked state at the time point when the unlatch switch is switched between ON and OFF, the latch mechanism of the door lock device is not switched from the latched state to the unlatched state.

A need thus exists for a vehicle door opening device which is not susceptible to the drawback mentioned above.

SUMMARY

A vehicle door opening device according to this disclosure is a vehicle door opening device that controls a door lock device including a latch mechanism that is switchable between a latched state in which a vehicle door is not allowed to be opened with respect to a vehicle body and an unlatched state in which the vehicle door is allowed to be opened with respect to the vehicle body, and configured to be switchable between a locked state in which switching of the latch mechanism from the latched state to the unlatched state is not allowed and an unlocked state in which the switching of the latch mechanism from the latched state to the unlatched state is allowed. The vehicle door opening device includes:

a first operation member and a second operation member operable by a user from outside of a vehicle;

a lock control device configured to switch the door lock device from the locked state to the unlocked state when an operation on the first operation member is detected while the door lock device is in the locked state; and a latch control device configured to: when an operation on the second operation member is detected while the door lock device is in the unlocked state, switch the latch mechanism from the latched state to the unlatched state; when the operation on the second operation member is detected while the door lock device is in the locked state and when the operation on the first operation member is detected before a predetermined time elapses after the operation on the second operation member is detected, switch the latch mechanism from the latched state to the unlatched state; and, when the operation on the second operation member is detected while the door lock device is in the locked state and when the operation on the first operation member is not detected before the predetermined time elapses after the operation on the second operation member is detected, maintain the latch mechanism in the latched state.

BRIEF DESCRIPTION OF THE DRAWINGS

The foregoing and additional features and characteristics of this disclosure will become more apparent from the following detailed description considered with the reference to the accompanying drawings, wherein:

FIG. 2 is a time chart showing a control of the vehicle door opening device;

FIG. 3 is a time chart showing a control of the vehicle door opening device;

FIG. 4 is a time chart showing a control of the vehicle door opening device; and FIG. 5 is a flowchart showing an unlatch routine executed by an E-latch ECU.

DETAILED DESCRIPTION

Figure 1:
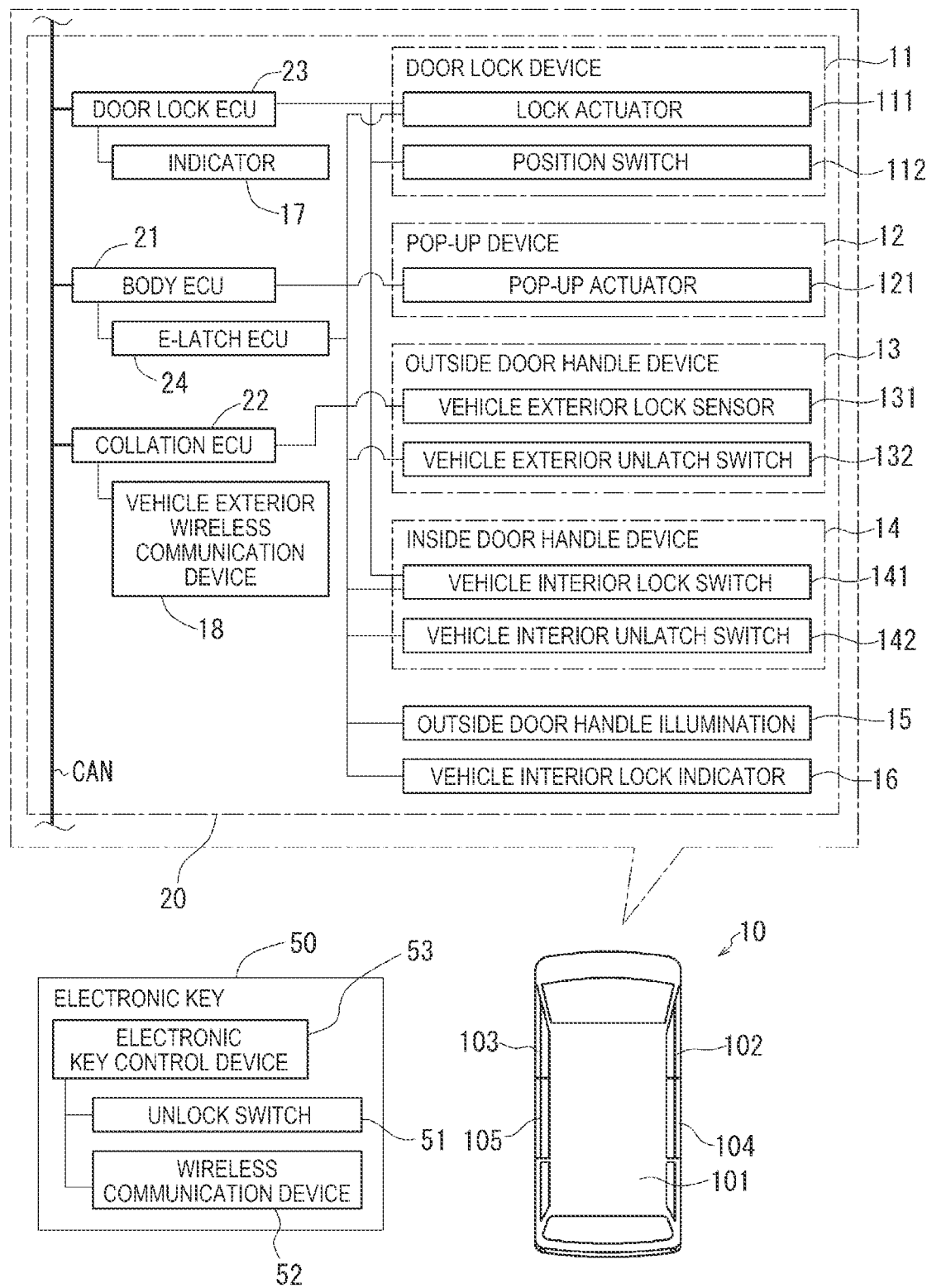
FIG. 1 is a diagram showing a configuration of a vehicle and a vehicle door opening device.

Hereinafter, an embodiment disclosed here will be described with reference to the drawings. In the following description, a vehicle door opening device according to the embodiment disclosed here may be abbreviated as a "door opening device".

Vehicle

FIG. 1 is a schematic diagram showing a configuration example of a vehicle 10 and a door opening device 20 mounted on the vehicle 10. As shown in FIG. 1, the vehicle 10 includes a predetermined number of vehicle doors 102, 103, 104, and 105 for a user (occupant) to get on and off. FIG. 1 shows an example in which the vehicle 10 includes four vehicle doors of a D seat door 102 (right front vehicle door), a P seat door 103 (left front vehicle door), an RrR seat door 104 (right rear vehicle door), and an RrL seat door 105 (left rear vehicle door). Each of the vehicle doors 102, 103, 104, and 105 is provided so as to be openable and closable with respect to a vehicle body 101, and is movable between a closed position and an open position by moving with respect to the vehicle body 101. The closed position of each of the vehicle doors 102, 103, 104, and 105 is a position at which an opening provided in the vehicle body 101 for a user to get on and off is closed. The open position is a position at which the opening is not closed.

Door Opening Device

The door opening device 20 includes a door lock device 11, a pop-up device 12, an outside door handle device 13, an inside door handle device 14, an outside door handle illumination 15, a vehicle interior lock indicator 16, an indicator 17, a vehicle exterior wireless communication device 18, a body ECU 21, a collation ECU 22, a door lock ECU 23, and an E-latch ECU 24. In FIG. 1, for simplification, the door lock device 11, the pop-up device 12, the outside door handle device 13, the inside door handle device 14, the outside door handle illumination 15, the vehicle interior lock indicator 16, the vehicle exterior wireless communication device 18, and the E-latch ECU 24 are illustrated one by one. In practice, the above devices are provided for each of the vehicle doors 102, 103, 104, and 105. That is, the door opening device 20 includes the same number of the devices as the vehicle doors 102, 103, 104, and 105. The vehicle exterior wireless communication devices 18 may be provided in a part of the vehicle doors 102, 103, 104, and 105. For example, the vehicle exterior wireless communication devices 18 may be provided in the D seat door 102 and the P seat door 103, and may not be provided in the RrR seat door 104 and the RrL seat door 105.

Each door lock device 11 includes a latch mechanism (not shown), an actuator (hereinafter, referred to as a "lock actuator 111"), and a position switch 112. The latch mechanism is configured to be switchable between a latched state and an unlatched state. The latched state is a state in which a latch provided in the latch mechanism engages with a striker provided in the vehicle body 101, so that the corresponding vehicle door 102, 103, 104, or 105 is not allowed to move from the closed position to the open position (in other words, the corresponding vehicle door 102, 103, 104, or 105 is held at the closed position). The unlatched state is a state in which the latch does not engage with the striker, so that the corresponding vehicle door 102, 103, 104, or 105 is allowed to move from the closed position to the open position.

Each door lock device 11 is configured to be switchable between a locked state and an unlocked state. The locked state is a state in which the latch mechanism is not allowed to switch from the latched state to the unlatched state when the latch mechanism is in the latched state. The unlocked state is a state in which the latch mechanism is allowed to switch from the latched state to the unlatched state when the latch mechanism is in the latched state. Each door lock device 11 is configured to be able to switch the latch mechanism from the latched state to the unlatched state, from the locked state to the unlocked state, and from the unlocked state to the locked state by a driving force of the lock actuator 111.

A specific configuration of the door lock device 11 is not particularly limited, and a door lock device known in the related art can be applied. For example, a vehicle door lock device disclosed in JP 2021-85292A can be applied to such a door lock device 11. In this case, an electric motor in JP 2021-85292A corresponds to the lock actuator 111 in the present embodiment.

The position switch 112 of each door lock device 11 is configured to detect whether the door lock device 11 is in the locked state or the unlocked state. For example, the position switch 112 is configured to switch between ON and OFF in accordance with a position of a control lever or an active lever in JP 2020-94410A. Therefore, the door lock ECU 23, which will be described later, can detect whether each door lock device 11 is in the locked state or the unlocked state by detecting whether the position switch 112 is ON or OFF.

Each pop-up device 12 includes an actuator (hereinafter, referred to as a "pop-up actuator 121"). Then, each pop-up device 12 can move the corresponding vehicle door 102, 103, 104, or 105 from the closed position to the open position slightly by a driving force of the pop-up actuator 121. Such an operation is referred to as a pop-up operation. A specific configuration of each pop-up device 12 is not particularly limited, and a pop-up device known in the related art can be applied. For example, a vehicle door pop-up device disclosed in JP 2015-190115A can be applied to each pop-up device 12.

Each outside door handle device 13 includes an outside handle grip (not shown), a vehicle exterior lock sensor 131, and a vehicle exterior unlatch switch 132. The outside handle grip is an operation member provided on a vehicle exterior side of the corresponding vehicle door 102, 103, 104, or 105, and is an operation member that can be operated from the outside of the vehicle 10.

The vehicle exterior lock sensor 131 is an example of a first operation member disclosed here, and is an operation member that can be operated by a user from the outside of the vehicle 10. A touch sensor capable of detecting approach and contact of a finger or the like of the user is applied to the vehicle exterior lock sensor 131. The vehicle exterior unlatch switch 132 is an example of a second operation member disclosed here, and is an operation member that can be operated by the user from the outside of the vehicle 10. A push button switch that switches between ON and OFF by pushing a movable member such as a button is applied to the vehicle exterior unlatch switch 132. In the present embodiment, an example in which the vehicle exterior unlatch switch 132 is a normally open switch is shown.

The vehicle exterior lock sensor 131 and the vehicle exterior unlatch switch 132 are provided on a portion (a portion on which the finger is hooked) of the outside handle grip which is gripped by the user. Therefore, the finger of the user comes into contact with (touches) the vehicle exterior lock sensor 131 by an operation by the user hooking the outside handle grip with the finger. Then, the vehicle exterior unlatch switch 132 is switched from OFF to ON by an operation by the user gripping the outside handle grip. Thereafter, when the user releases a hand from the outside handle grip, the vehicle exterior unlatch switch 132 is switched from ON to OFF.

A specific configuration of the outside door handle device 13 is not particularly limited, and an outside door handle device known in the related art can be applied. For example, a door handle disclosed in JP 2020-94410A can be applied to such the outside door handle device 13. In this case, a vehicle exterior lock sensor plate in JP 2020-94410A corresponds to the vehicle exterior lock sensor 131 in the present embodiment. An unlatch lever and an opening and closing switch in JP 2020-94410A correspond to the vehicle exterior unlatch switch 132 in the present embodiment.

Each inside door handle device 14 includes a vehicle interior lock switch 141 and a vehicle interior unlatch switch 142. The vehicle interior lock switch 141 is an operation member operated by an occupant in the vehicle to switch the door lock device 11 of the corresponding vehicle door 102, 103, 104, or 105 from the locked state to the unlocked state and from the unlocked state to the locked state. The vehicle interior unlatch switch 142 is an operation member operated by the user (occupant) in the vehicle to switch the latch mechanism of the door lock device 11 of the corresponding vehicle door 102, 103, 104, or 105 from the latched state to the unlatched state.

The body ECU 21, the collation ECU 22, the door lock ECU 23, and the E-latch ECU 24 corresponding to each of the vehicle doors 102, 103, 104, and 105 include a computer including a CPU, a ROM, a RAM, a readable and writable nonvolatile memory, an interface, and the like. The CPU sequentially executes a predetermined program (routine) to perform reading of data, numerical calculation, output of a calculation result, and the like. In the ROM, a program executed by the CPU, a look-up table (map), and the like are stored in advance. The RAM can temporarily store data. The body ECU 21, the collation ECU 22, and the door lock ECU 23 are connected to one another via a controller area network (CAN). The body ECU 21 and each of the E-latch ECUs 24 are communicably connected to each other in compliance with a clock extension peripheral interface (CXPI) standard. The body ECU 21, the collation ECU 22, the door lock ECU 23, and the E-latch ECUs 24 can transmit and receive data and signals to and from one another.

The body ECU 21 is an ECU that integrally controls devices mounted on the vehicle 10.

The collation ECU 22 is an example of a collation device disclosed here. The collation ECU 22 is connected to the vehicle exterior lock sensor 131 of each outside door handle device 13, and can detect whether a touch operation is performed on the vehicle exterior lock sensor 131 of each outside door handle device 13. The collation ECU 22 is connected to the vehicle exterior wireless communication device 18 of each of the vehicle doors 102, 103, 104, and 105. The vehicle exterior wireless communication device 18 is configured to be capable of wireless communication with a wireless communication device 52 of an electronic key 50 that is present outside the vehicle.

The electronic key 50 is an example of a portable control device disclosed here, and is a device that can be carried by a user. The electronic key 50 includes an unlock switch 51, the wireless communication device 52, and an electronic key control device 53. The unlock switch 51 is a switch operated by the user to switch the door lock device 11 from the locked state to the unlocked state. The wireless communication device 52 is configured to be capable of wireless communication with the vehicle exterior wireless communication device 18. The electronic key control device 53 controls the wireless communication device 52. The electronic key control device 53 is a computer including a CPU, a ROM, and a RAM. In the electronic key control device 53, an ID code unique to the electronic key 50 is registered (for example, data indicating the ID code is stored in the ROM).

The door lock ECU 23 is an example of a lock control device disclosed here. The door lock ECU 23 is connected to each door lock device 11. The door lock ECU 23 drives the lock actuator 111 of each door lock device 11 to switch each door lock device 11 from the locked state to the unlocked state and from the unlocked state to the locked state. The door lock ECU 23 is connected to the position switch 112 of each door lock device 11. Then, the door lock ECU 23 detects a state (ON or OFF) of the position switch 112 of each door lock device 11, and determines, based on a detection result, whether each door lock device 11 is in the locked state or the unlocked state. Further, the door lock ECU 23 transmits, to each E-latch ECU 24 via the body ECU 21, a determination result as to whether each door lock device 11 is in the locked state or the unlocked state.

The door lock ECU 23 is connected to the indicator 17 and can drive (operate) the indicator 17. The indicator 17 is an example of a notification device disclosed here. When the door lock ECU 23 drives the lock actuator 111 of each door lock device 11 to switch each door lock device 11 from the locked state to the unlocked state, the door lock ECU 23 drives the indicator 17 to notify the user that each door lock device 11 is switched from the locked state to the unlocked state. For example, a direction indicator included in the vehicle 10 can be applied to the indicator 17. In this case, the door lock ECU 23 notifies the user that each door lock device 11 is switched from the locked state to the unlocked state by blinking the direction indicator, which is the indicator 17, a predetermined number of times.

The E-latch ECU 24 is an example of a latch control device disclosed here. Each E-latch ECU 24 is connected to the vehicle exterior unlatch switch 132 of the outside door handle device 13 and the vehicle interior unlatch switch 142 of the inside door handle device 14 of the respective one of corresponding vehicle doors 102, 103, 104, and 105. Each E-latch ECU 24 can detect whether each of the vehicle exterior unlatch switch 132 and the vehicle interior unlatch switch 142 is operated (ON or OFF). Each E-latch ECU 24 is connected to the door lock device 11 of the corresponding vehicle door 102, 103, 104, or 105. Then, Each E-latch ECU 24 drives the lock actuator 111 of the door lock device 11 of the corresponding vehicle door 102, 103, 104, or 105 to switch the latch mechanism of the door lock device 11 of the corresponding vehicle door 102, 103, 104, or 105 from the latched state to the unlatched state. Each E-latch ECU 24 can acquire, via the body ECU 21, a determination result of "whether the door lock device 11 of the corresponding vehicle door 102, 103, 104, or 105 is in the locked state or the unlocked state" by the door lock ECU 23. Therefore, each E-latch ECU 24 can detect whether the door lock device 11 of the corresponding vehicle door 102, 103, 104, or 105 is in the locked state or the unlocked state, and can detect that the door lock device 11 is switched from the locked state to the unlocked state and from the unlocked state to the locked state.

Further, each E-latch ECU 24 is connected to the outside door handle illumination 15 and the vehicle interior lock indicator 16 of the corresponding vehicle door 102, 103, 104, or 105, and can operate the outside door handle illumination 15 and the vehicle interior lock indicator 16.

Each of the outside door handle illumination 15 and the vehicle interior lock indicator 16 is a light emitting device including a light source. The outside door handle illumination 15 is provided in the vicinity of the outside handle grip on a surface on the vehicle exterior side of the corresponding vehicle door 102, 103, 104, or 105, and notifies the user of a position of the outside handle grip by emitting light. Each E-latch ECU 24 causes the outside door handle illumination 15 to emit light, for example, when brightness around the vehicle 10 is equal to or less than a predetermined threshold value and during a collation satisfaction period to be described later, so that the outside handle grip can be easily seen by the user.

The vehicle interior lock indicator 16 is an example of a notification device disclosed here. Each E-latch ECU 24 switches between light emission (lighting) and light off of the vehicle interior lock indicator 16 in accordance with whether the door lock device 11 of the corresponding vehicle door 102, 103, 104, or 105 is in the locked state or the unlocked state. For example, each E-latch ECU 24 can notify the user whether the door lock device 11 is in the locked state or the unlocked state by causing the vehicle interior lock indicator 16 to emit light while the door lock device 11 of the corresponding vehicle door 102, 103, 104, or 105 is in the locked state and causing the vehicle interior lock indicator 16 to turn the light off while the door lock device 11 is in the unlocked state.

Door Opening Control

Next, a door opening control executed by the door opening device 20 will be described. The door opening control according to the present embodiment is a control of "when the user executes, from the outside of the vehicle, an operation of switching each door lock device 11 from the locked state to the unlocked state and an operation of switching the latch mechanism of each door lock device 11 to the unlatched state while each door lock device 11 is in the locked state, the latch mechanism of each door lock device 11 is switched to the unlatched state or is not switched to the unlatched state in accordance with the operations thereof". In the present embodiment, the touch operation on the vehicle exterior lock sensor 131 is "the operation of switching each door lock device 11 from the locked state to the unlocked state from the outside of the vehicle", and the operation of switching the vehicle exterior unlatch switch 132 from OFF to ON (the operation of pressing the button of the vehicle exterior unlatch switch 132) is "the operation of switching the latch mechanism of each door lock device 11 to the unlatched state".

While a vehicle exterior collation condition is satisfied, the collation ECU 22 repeatedly executes a control of "causing the vehicle exterior wireless communication device 18 of each of the vehicle doors 102, 103, 104, and 105 to emit a radio wave carrying a request signal to a predetermined range outside the vehicle" at a predetermined cycle. The request signal is a signal for requesting a response to the electronic key 50. The vehicle exterior collation condition is a condition for executing collation with the electronic key 50 that is present within the predetermined range outside the vehicle, and is, for example, a condition that is satisfied while a main power supply of the vehicle 10 is OFF and each door lock device 11 is in the locked state. A specific size of the "predetermined range outside the vehicle" is not limited, but, for example, a "range in which a distance from the vehicle exterior wireless communication device 18 is within about 1 m" can be applied. In addition, the collation ECU 22 repeatedly executes processing of "analyzing (determining) whether the vehicle exterior wireless communication device 18 of each of the vehicle doors 102, 103, 104, and 105 receives a signal emitted from the wireless communication device 52 of the electronic key 50 (in other words, analyzing whether a signal generated by the electronic key 50 is included in the radio wave received by the vehicle exterior wireless communication device 18 of each of the vehicle doors 102, 103, 104, and 105)" in a predetermined cycle while the vehicle exterior collation condition is satisfied.

The electronic key control device 53 of the electronic key 50 repeatedly executes processing of "analyzing whether the radio wave carrying the request signal is received (in other words, whether the request signal is carried in the received radio wave)" in the predetermined cycle. Then, when the wireless communication device 52 receives the radio wave carrying the request signal generated by the collation ECU 22, the electronic key control device 53 generates a signal including an ID code of the electronic key 50 and causes the wireless communication device 52 to emit a radio wave carrying the generated signal. When the electronic key control device 53 detects an operation on the unlock switch 51, the electronic key control device 53 generates a signal including an ID code and a "signal requesting to switch the door lock device 11 from the locked state to the unlocked state" regardless of whether the wireless communication device 52 receives the radio wave carrying the request signal, and causes the wireless communication device 52 to emit a radio wave carrying the generated signal.

When the collation ECU 22 receives the radio wave carrying the signal including the ID code, the collation ECU 22 determines whether the ID code included in the signal matches a registered regular ID code (in other words, whether the electronic key 50 is the electronic key 50 associated with the vehicle 10). Then, when the collation ECU 22 determines that the ID code included in the signal matches the registered regular ID code, the collation ECU 22 determines that the collation is satisfied. That is, the collation ECU 22 determines that the electronic key 50 associated with the vehicle 10 is present within the predetermined range from the vehicle 10. On the other hand, the collation ECU 22 determines that the collation is not satisfied in any of a case where the radio wave carrying the signal including the ID code is not received and a case where the radio wave carrying the signal including the ID code is received but the ID code included in the signal does not match the regular ID code (in other words, a case where it is determined that the electronic key 50 is not the electronic key 50 associated with the vehicle 10). That is, the collation ECU 22 determines that the electronic key 50 associated with the vehicle 10 is not present within the predetermined range from the vehicle 10.

A period from when the collation ECU 22 determines that the collation is satisfied to when the collation ECU 22 determines that the collation is not satisfied is a period during which the collation is satisfied. In the present embodiment, the period is referred to as a "collation satisfaction period". It can also be said that the "collation satisfaction period" is a period in which the electronic key 50 associated with the vehicle 10 is present within the predetermined range from the vehicle 10. According to such control, for example, when the user carrying the electronic key 50 approaches the vehicle 10 by a predetermined distance or less (enters the predetermined range in the vicinity of the vehicle 10), the collation is satisfied, and when the user moves away from the vehicle 10 by more than the predetermined distance (moves to the outside of the predetermined range), the collation is not satisfied.

The collation ECU 22 generates an unlock request signal when detecting the touch operation on each vehicle exterior lock sensor 131 within the collation satisfaction period. When each vehicle exterior lock sensor 131 is a capacitive sensor, each vehicle exterior lock sensor 131 can detect that a finger or the like of the user approaches. Therefore, in this case, the "touch operation" includes not only that the user brings the finger or the like into contact with the vehicle exterior lock sensor 131 but also that the user brings the finger or the like approaching the vehicle exterior lock sensor 131. The unlock request signal generated by the collation ECU 22 is an example of a "signal indicating that a first operation member is operated" disclosed here. The unlock request signal generated by the touch operation on each vehicle exterior lock sensor 131 is an example of a first unlock request signal disclosed here. The collation ECU 22 transmits, via the body ECU 21, the generated unlock request signal to the door lock ECU 23 and each E-latch ECU 24. In this case, the collation ECU 22 includes, in the unlock request signal, information indicating that the unlock request signal is generated in accordance with the touch operation on the vehicle exterior lock sensor 131. Therefore, the door lock ECU 23 and each E-latch ECU 24 can detect that the touch operation is performed on each vehicle exterior lock sensor 131 by receiving the unlock request signal. When the door lock ECU 23 receives the unlock request signal from the collation ECU 22 via the body ECU 21, the door lock ECU 23 drives the lock actuator 111 of each door lock device 11 to switch each door lock device 11 from the locked state to the unlocked state.

The collation ECU 22 also determines whether the collation is satisfied as described above when the radio wave carrying the signal including the ID code and the signal requesting to switch the door lock device 11 from the locked state to the unlocked state is received by the vehicle exterior wireless communication device 18. When the collation ECU 22 determines that the collation is satisfied, the collation ECU 22 generates an unlock request signal and transmits the generated unlock request signal to the door lock ECU 23 and each E-latch ECU 24 via the body ECU 21. The unlock request signal in this case is an example of a second unlock request signal disclosed here. In this case, the collation ECU 22 includes, in the unlock request signal (second unlock request signal), information indicating that the unlock request signal is generated in accordance with the reception of the signal requesting to switch the door lock device 11 from the locked state to the unlocked state from the electronic key 50 (in other words, the operation of the unlock switch 51 of the electronic key 50).

Control executed by each E-latch ECU 24 differs depending on whether the door lock device 11 is in the unlocked state.

(1) When Each Door Lock Device is in Unlocked State

When each E-latch ECU 24 detects that the vehicle exterior unlatch switch 132 is switched from OFF to ON while the door lock device 11 of the corresponding vehicle door 102, 103, 104, or 105 is in the unlocked state, the E-latch ECU 24 drives the lock actuator 111 of the door lock device 11 of the corresponding vehicle door 102, 103, 104, or 105 to switch the latch mechanism of the door lock device 11 from the latched state to the unlatched state. Thereafter, the body ECU 21 drives the pop-up actuator 121 of the pop-up device 12 corresponding to the vehicle door 102, 103, 104, or 105 of the door lock device 11 whose latch mechanism is switched from the latched state to the unlatched state, thereby executing the pop-up operation of the corresponding vehicle door 102, 103, 104, or 105.

(2) When Each Door Lock Device is in Locked State

When each E-latch ECU 24 detects that the vehicle exterior unlatch switch 132 is switched from OFF to ON while the door lock device 11 of the corresponding vehicle door 102, 103, 104, or 105 is in the locked state, the E-latch ECU 24 starts to measure an elapsed time from a time point when the vehicle exterior unlatch switch 132 is switched from OFF to ON. Then, subsequent control of each E-latch ECU 24 differs depending on the case as follows. Hereinafter, "a period from a time point when the vehicle exterior unlatch switch 132 is switched from OFF to ON to a time when a predetermined time elapses" is referred to as an "unlock operation waiting period". The unlock operation waiting period may be referred to as a holding time during which the vehicle exterior unlatch switch 132 is held in the ON state.

(2-1) When Unlock Request Signal Generated by Touch Operation on Vehicle Exterior Lock Sensor 131 is Received by Door Lock ECU During Unlock Operation Waiting Period In this case, each E-latch ECU 24 switches the latch mechanism of the door lock device 11 of the vehicle door 102, 103, 104, or 105 corresponding to the vehicle exterior lock sensor 131, in which the touch operation is detected, from the latched state to the unlatched state. As described above, when the collation ECU 22 generates the unlock request signal in accordance with the touch operation on the vehicle exterior lock sensor 131, the collation ECU 22 includes information, in the unlock request signal, indicating that the unlock request signal is generated due to the touch operation on the vehicle exterior lock sensor 131. Therefore, each E-latch ECU 24 can determine, based on presence or absence of the information, whether the received unlock request signal is the unlock request signal generated by the touch operation on the vehicle exterior lock sensor 131.

(2-2) When Unlock Request Signal not Generated by Touch Operation on Vehicle Exterior Lock Sensor 131 is Received During Unlock Operation Waiting Period An "unlock request signal not generated by the touch operation on the vehicle exterior lock sensor 131" is either an "unlock request signal due to an operation of the unlock switch 51 of the electronic key 50" or an "unlock request signal due to an operation on the vehicle interior lock switch 141". When the unlock request signals are received, each E-latch ECU 24 does not switch the latch mechanism from the latched state to the unlatched state. However, when the door lock ECU 23 receives the unlock request signals, the door lock ECU 23 switches each door lock device 11 from the locked state to the unlocked state. Therefore, when each E-latch ECU 24 detects that the vehicle exterior unlatch switch 132 is switched from OFF to ON thereafter, each E-latch ECU 24 switches the latch mechanism of the door lock device 11 of the corresponding vehicle door 102, 103, 104, or 105 from the latched state to the unlatched state.

(2-3) When Unlock Request Signal is not Received During Unlock Operation Waiting Period In this case, each E-latch ECU 24 does not switch the latch mechanism of the door lock device 11 of the corresponding vehicle door 102, 103, 104, or 105 from the latched state to the unlatched state even though the E-latch ECU 24 detects that the vehicle exterior unlatch switch 132 is switched from OFF to ON.

Next, an operation of the door opening device 20 when the user operates (grips) the outside handle grip of the outside door handle device 13 of one vehicle door within the collation satisfaction period will be described. FIG. 2 is a time chart showing the operation of the door opening device 20 in this case.

A time point $t_{101}$ in FIG. 2 is a time point at which the touch operation on the vehicle exterior lock sensor 131 is detected by the collation ECU 22. A time point $t_{103}$ is a time point at which the switching of the vehicle exterior unlatch switch 132 from OFF to ON is detected by the E-latch ECU 24. A time point $t_{104}$ is a time point at which the collation ECU 22 detects that the touch operation on the vehicle exterior lock sensor 131 is not performed, and a time point at which the switching of the vehicle exterior unlatch switch 132 from ON to OFF is detected by the E-latch ECU 24. For example, the time point $t_{104}$ is a time point at which the user releases a hand from the outside handle grip or a time point immediately after that.

As described above, the finger of the user comes into contact with the vehicle exterior lock sensor 131 by the operation by the user hooking the outside handle grip. Then, the vehicle exterior unlatch switch 132 is switched from OFF to ON by the operation by the user gripping the outside handle grip. Therefore, as shown in FIG. 2, the time point $t_{103}$ at which the switching of the vehicle exterior unlatch switch 132 from OFF to ON is detected by the E-latch ECU 24 is a time point later than the time point $t_{101}$ at which the touch operation on the vehicle exterior lock sensor 131 is detected by the collation ECU 22.

When the touch operation on the vehicle exterior lock sensor 131 is detected, the collation ECU 22 generates an unlock request signal. Then, the collation ECU 22 transmits, via the body ECU 21, the generated unlock request signal to the door lock ECU 23 and each E-latch ECU 24. When the door lock ECU 23 receives the unlock request signal, the door lock ECU 23 drives the lock actuator 111 of the door lock device 11 to switch the door lock device 11 from the locked state to the unlocked state. A time point $t_{102}$ is a time point when the door lock ECU 23 receives the unlock request signal and switches the door lock device 11 from the locked state to the unlocked state. The time point $t_{102}$ can also be referred to as a "time point at which the touch operation on the vehicle $t_{102}$ exterior lock sensor 131 is detected by the door lock ECU 23 and each E-latch ECU 24". In the present embodiment, the unlock request signal is generated by the collation ECU 22, and is transmitted to the door lock ECU 23 and each E-latch ECU 24 via the body ECU 21. Therefore, as shown in FIG. 2, the time point $t_{102}$ at which the door lock ECU 23 and each E-latch ECU 24 receive a door lock request signal (a time point at which the touch operation on the vehicle exterior lock sensor 131 is detected by the door lock ECU 23 and each E-latch ECU 24) is later than the time point $t_{101}$ at which the touch operation on the vehicle exterior lock sensor 131 is detected by the collation ECU 22.

When each E-latch ECU 24 detects that the vehicle exterior unlatch switch 132 is switched from OFF to ON (time point $t_{103}$), the E-latch ECU 24 drives the lock actuator 111 of the door lock device 11 of the corresponding vehicle door 102, 103, 104, or 105 to switch the latch mechanism of the door lock device 11 from the latched state to the unlatched state. The vehicle exterior unlatch switch 132 is connected to each E-latch ECU 24. Therefore, each E-latch ECU 24 can detect that the vehicle exterior unlatch switch 132 is switched from OFF to ON in a short time (or substantially instantaneously). Thereafter, the body ECU 21 drives the pop-up actuator 121 of the pop-up device 12 to execute the pop-up operation of the corresponding vehicle door 102, 103, 104, or 105. As described above, when the user operates the outside handle grip and the door lock device 11 is in the unlocked state at the time point $t_{103}$ at which the vehicle exterior unlatch switch 132 is switched from OFF to ON, the latch mechanism of the door lock device 11 is switched from the latched state to the unlatched state.

When an operation speed of the outside handle grip of the user is increased, a "time from when the finger of the user comes into contact with the vehicle exterior lock sensor 131 to when the vehicle exterior unlatch switch 132 is switched from OFF to ON" is shortened. When the time is shorter than "the time from when the finger of the user comes into contact with the vehicle exterior lock sensor 131 to when the door lock ECU 23 and each E-latch ECU 24 receive the unlock request signal (or the time to when the door lock device 11 is switched to the unlocked state)", the time point $t_{103}$ in FIG. 2 may be before the time point $t_{102}$. That is, at the time point (time point $t_{103}$) at which each E-latch ECU 24 detects the switching of the vehicle exterior unlatch switch 132 from OFF to ON, the door lock ECU 23 and each E-latch ECU 24 have not yet detected the touch operation on the vehicle exterior lock sensor 131. Therefore, in this case, at the time point (time point $t_{103}$) at which each E-latch ECU 24 detects the switching of the vehicle exterior unlatch switch 132 from OFF to ON, the door lock device 11 is in the locked state and is not switched to the unlocked state. Therefore, in the control in which "the latch mechanism is not switched to the unlatched state when the vehicle exterior unlatch switch 132 is turned ON while the door lock device 11 is in the locked state", the vehicle doors 102, 103, 104, and 105 are not opened in such a case. That is, the user cannot open the vehicle doors 102, 103, 104, and 105 even though the vehicle exterior lock sensor 131 and the vehicle exterior unlatch switch 132 are operated in a regular order.

Therefore, even in such a case, the door opening device 20 according to the present embodiment executes a control shown in FIG. 3 such that the vehicle doors 102, 103, 104, and 105 are opened. In FIG. 3, a time point $t_{201}$ is a time point at which the touch operation on the vehicle exterior lock sensor 131 is detected by the collation ECU 22, and a time point $t_{202}$ is a time point at which the switching of the vehicle exterior unlatch switch 132 from OFF to ON is detected by the E-latch ECU 24. A time point $t_{204}$ is a time point at which the collation ECU 22 detects that the touch operation on the vehicle exterior lock sensor 131 is not performed, and a time point at which the collation ECU 22 detects that the vehicle exterior unlatch switch 132 is switched from ON to OFF. The time points $t_{201}$, $t_{202}$, and $t_{204}$ correspond to the time points $t_{101}$, $t_{103}$, and $t_{104}$ in FIG. 2, respectively. However, since an operation speed of the user is faster than that in the case shown in FIG. 2, a time from the time point $t_{201}$ to the time point $t_{202}$ is shorter than the time from the time point $t_{101}$ to the time point $t_{103}$ shown in FIG. 2. Therefore, a time point $t_{203}$ at which the door lock ECU 23 and each E-latch ECU 24 receive an unlock request signal is later than the time point $t_{202}$ at which the E-latch ECU 24 detects that the vehicle exterior unlatch switch 132 is turned ON. That is, at the time point $t_{202}$ at which the E-latch ECU 24 detects that the vehicle exterior unlatch switch 132 is switched from OFF to ON, the door lock device 11 is in the locked state.

When each E-latch ECU 24 detects that the vehicle exterior unlatch switch 132 is switched from OFF to ON at the time point $t_{202}$ (that is, while the door lock device 11 is in the locked state), the E-latch ECU 24 starts measuring an elapsed time from the time point $t_{202}$. A time point $t_{205}$ indicates a time point at which a predetermined time is elapsed from the time point. A period from the time point $t_{202}$ to the time point $t_{205}$ is an "unlock operation waiting period".

When each E-latch ECU 24 receives the unlock request signal generated by the touch operation on the vehicle exterior lock sensor 131 of the outside door handle device 13 during the unlock operation waiting period, the E-latch ECU 24 switches the latch mechanism of the door lock device 11 of the vehicle door 102, 103, 104, or 105 corresponding to the vehicle exterior lock sensor 131 subjected to the touch operation from the latched state to the unlatched state. The control corresponds to the above control (2-1).

The vehicle door lock device disclosed in JP 2021-85292A is configured to be capable of switching the latch mechanism from the latched state to the unlatched state by driving the actuator even in the locked state. Therefore, when each door lock device 11 has such a configuration, at the time point $t_{203}$, each E-latch ECU 24 switches the latch mechanism from the latched state to the unlatched state without the door lock ECU 23 switching the door lock device 11 of the corresponding vehicle door 102, 103, 104, or 105 from the locked state to the unlocked state. However, when the door lock device 11 is configured such that the latch mechanism cannot be switched from the latched state to the unlatched state unless the door lock device 11 is switched from the locked state to the unlocked state, the door lock ECU 23 switches the door lock device 11 from the locked state to the unlocked state at the time point $t_{203}$, and then each E-latch ECU 24 switches the door lock device 11 from the latched state to the unlatched state.

On the other hand, each E-latch ECU 24 does not switch the latch mechanism from the latched state to the unlatched state when the E-latch ECU 24 receives the unlock request signal that does not depend on the touch operation on the vehicle exterior lock sensor 131 of the outside door handle device 13 during the unlock operation waiting period. The "unlock request signal that does not depend on the touch operation on the vehicle exterior lock sensor 131 of the outside door handle device 13" is an unlock request signal based on an operation of the unlock switch 51 of the electronic key 50 and an unlock request signal based on an operation of the vehicle interior lock switch 141. The control corresponds to the above control (2-2). When the E-latch ECU 24 does not receive the unlock request signal during the unlock operation waiting period, the E-latch ECU 24 maintains the door lock device 11 in the latched state. The control corresponds to the above (2-3).

According to such control, the user can open the vehicle doors 102, 103, 104, and 105 even when the "time from when the finger of the user comes into contact with the vehicle exterior lock sensor 131 to when the door lock ECU 23 and each E-latch ECU 24 detect the switching of the vehicle exterior unlatch switch 132 from OFF to ON" is shorter than the "time from when the finger of the user comes into contact with the vehicle exterior lock sensor 131 to when the door lock ECU 23 and each E-latch ECU 24 receive the unlock request signal (time to when the door lock ECU 23 and each E-latch ECU 24 detect the touch operation on the vehicle exterior lock sensor 131)". That is, the user can open the vehicle doors 102, 103, 104, and 105 regardless of the operation speed (particularly, even when the operation speed is high) by operating the vehicle exterior lock sensor 131 and the vehicle exterior unlatch switch 132 in the regular order.

When the E-latch ECU 24 does not receive the unlock request signal during the unlock operation waiting period and receives the unlock request signal after the unlock operation waiting period is terminated (in other words, outside the unlock operation waiting period), the E-latch ECU 24 does not switch to the unlatched state.

Next, it is assumed that a user A who is not carrying the electronic key 50 operates the outside handle grip, and then a user B who is present at a position, where a radio wave emitted from the vehicle exterior wireless communication device 18 does not reach, operates the unlock switch 51 of the electronic key 50. In this case, in the control in which "each E-latch ECU 24 switches the latch mechanism of the door lock device 11 from the latched state to the unlatched state when the E-latch ECU 24 receives the unlock request signal during the unlock operation waiting period", the door lock device 11 may be switched to the unlatched state at a time point not intended by the user. For example, it is assumed that the user A is carrying the electronic key 50 even though the user A is not carrying the electronic key 50, and operates the outside handle grip. Since the vehicle door is not opened by the operation of the outside handle grip, the user A notices that the user A is not carrying the electronic key 50, and moves away from the vehicle 10 to take the electronic key 50. At this time, when the user B carrying the electronic key 50 operates the unlock switch 51 of the electronic key 50, the door lock device 11 may be switched from the latched state to the unlatched state. In this case, the latch mechanism of the door lock device 11 is switched from the latched state to the unlatched state at a time point not intended by the user A. Therefore, in the present embodiment, when the unlock request signal received by each E-latch ECU 24 during the unlock operation waiting period is not the unlock request signal generated by the operation of the vehicle exterior lock sensor 131, the E-latch ECU 24 does not switch the door lock device 11 from the locked state to the unlocked state. However, when the door lock ECU 23 receives the unlock request signal, the door lock ECU 23 switches the door lock device 11 from the locked state to the unlocked state.

FIG. 4 is a time chart showing an operation of the door opening device 20 in such a case. A time point $t_{301}$ is a time point at which the door lock ECU 23 and each E-latch ECU 24 detect a touch operation on the vehicle exterior lock sensor 131 by the operation of the outside handle grip of the user A. A time point $t_{302}$ is a time point at which the door lock ECU 23 and the E-latch ECU 24 detect the switching of the vehicle exterior unlatch switch 132 from OFF to ON by the operation of the outside handle grip of the user A. A time point $t_{303}$ is a time point at which the collation ECU 22 detects that the touch operation on the vehicle exterior lock sensor 131 is not performed, and a time point at which the E-latch ECU 24 detects that the vehicle exterior unlatch switch 132 is switched from ON to OFF.

When the user B carrying the electronic key 50 is present at a position where a radio wave emitted from the vehicle exterior wireless communication device 18 does not reach, the collation ECU 22 does not satisfy the collation at the time point $t_{301}$ when the user A performs the touch operation on the vehicle exterior lock sensor 131. Therefore, the collation ECU 22 does not generate the unlock request signal by the touch operation of the user A on the vehicle exterior lock sensor 131. Therefore, each door lock device 11 is maintained in the locked state. Then, since each door lock device 11 is in the locked state at the time point $t_{302}$, each E-latch ECU 24 starts an unlock operation waiting period when detecting that the vehicle exterior unlatch switch 132 is switched from OFF to ON at this time point. A time point $t_{305}$ is a time point at which the unlock operation waiting period is terminated.

A time point $t_{304}$ is a time point at which the E-latch ECU 24 receives the unlock request signal generated by the operation of the unlock switch 51 of the electronic key 50 of the user B. The time point $t_{304}$ is in the unlock operation waiting period. However, the E-latch ECU 24 maintains the door lock device 11 in the latched state since the received unlock request signal is not the unlock request signal generated by the operation on the vehicle exterior lock sensor 131.

However, when the door lock ECU 23 receives the unlock request signal generated by the operation of the unlock switch 51 of the electronic key 50 of the user B, the door lock ECU 23 switches the door lock device 11 from the locked state to the unlocked state. Therefore, when the E-latch ECU 24 detects that the vehicle exterior unlatch switch 132 is switched from OFF to ON after the time point $t_{304}$, the E-latch ECU 24 switches the latch mechanism of the door lock device 11 of the vehicle door 102, 103, 104, or 105 corresponding to the vehicle exterior unlatch switch 132 from the latched state to the unlatched state. That is, when the vehicle exterior unlatch switch 132 is switched from OFF to ON again after the time point $t_{304}$, it can be considered that the user intends to open the vehicle door 102, 103, 104, or 105 corresponding to the vehicle exterior unlatch switch 132 switched from OFF to ON again. Therefore, in this case, the E-latch ECU 24 switches the latch mechanism of the door lock device 11 of the vehicle door 102, 103, 104, or 105 corresponding to the vehicle exterior unlatch switch 132 switched from OFF to ON again from the latched state to the unlatched state. Accordingly, the door lock device 11 can be switched from the locked state to the unlocked state in accordance with the intention of the user.

A length of the unlock operation waiting period is preferably 2 seconds or more and 4 seconds or less, and more preferably about 3 seconds. The reasons are as follows. While detecting the touch operation on the vehicle exterior lock sensor 131, the collation ECU 22 repeatedly transmits the unlock request signal at a predetermined cycle (for example, a cycle of 250 ms). Therefore, when the length of the unlock operation waiting period is too short, the door lock ECU 23 and each E-latch ECU 24 may fail to receive the unlock request signal depending on a state of the CAN. Therefore, in order to improve reliability of the reception of the unlock request signal by the door lock ECU 23 and each E-latch ECU 24, it is preferable to lengthen the length of the unlock operation waiting period to some extent. When the length of the unlock operation waiting period is 2 seconds or more, the door lock ECU 23 and each E-latch ECU 24 can more reliably receive the unlock request signal. On the other hand, when the length of the unlock operation waiting period is too long, an effect of increasing the reliability of the reception of the unlock request signal by the door lock ECU 23 and each E-latch ECU 24 does not change. Therefore, the length of the unlock operation waiting period is preferably 4 seconds or less.

Unlatch Routine

Next, an unlatch routine executed by each E-latch ECU 24 will be described. FIG. 5 is a flowchart showing an example of the unlatch routine executed by each E-latch ECU 24. While the door lock device 11 is in the latched state, each E-latch ECU 24 repeatedly and continuously executes the unlatch routine shown in FIG. 5 at a predetermined cycle.

In step S101, each E-latch ECU 24 determines whether an operation (hereinafter, referred to as an unlatch operation) for switching the latch mechanism of the door lock device 11 of the corresponding vehicle door 102, 103, 104, or 105 from the latched state to the unlatched state is performed. Specifically, each E-latch ECU 24 determines whether any one of the vehicle exterior unlatch switch 132 and the vehicle interior unlatch switch 142 of the corresponding vehicle door 102, 103, 104, or 105 is switched from OFF to ON (operated). When both the vehicle exterior unlatch switch 132 and the vehicle interior unlatch switch 142 remain OFF, each E-latch ECU 24 determines that the unlatch operation is not performed. In this case, each E-latch ECU 24 once terminates the unlatch routine. On the other hand, when each E-latch ECU 24 detects that at least one of the vehicle exterior unlatch switch 132 and the vehicle interior unlatch switch 142 is turned ON, each E-latch ECU 24 determines that the unlatch operation is performed. In this case, each E-latch ECU 24 advances the processing to step S102.

In step S102, each E-latch ECU 24 determines whether the door lock device 11 of the corresponding vehicle door 102, 103, 104, or 105 is in the locked state. For example, each E-latch ECU 24 acquires, from the door lock ECU 23, a determination result based on a detection result of the position switch 112 of the door lock device 11 of the corresponding vehicle door 102, 103, 104, or 105. When the door lock device 11 of the corresponding vehicle door 102, 103, 104, or 105 is in the unlocked state, the E-latch ECU 24 advances the processing to step S103. On the other hand, when the door lock device 11 of the corresponding vehicle door 102, 103, 104, or 105 is in the locked state, the E-latch ECU 24 advances the processing to step S104.

In step S103, each E-latch ECU 24 drives the lock actuator 111 of the door lock device 11 of the corresponding vehicle door 102, 103, 104, or 105, and switches the latch mechanism of the door lock device 11 of the corresponding vehicle door 102, 103, 104, or 105 from the latched state to the unlatched state. Then, the unlatch routine is terminated. Thereafter, the body ECU 21 drives the pop-up actuator 121 of the pop-up device 12 corresponding to the vehicle door 102, 103, 104, or 105 in which the unlatch operation is detected in step S101, thereby executing a pop-up operation of the corresponding vehicle door 102, 103, 104, or 105.

In step S104, each E-latch ECU 24 determines whether the unlatch operation detected in step S101 is an operation on the vehicle exterior unlatch switch 132. When the unlatch operation is not an operation on the vehicle exterior unlatch switch 132 (when the unlatch operation is an operation on the vehicle interior unlatch switch 142), each E-latch ECU 24 temporarily terminates the unlatch routine. On the other hand, when the unlatch operation is an operation on the vehicle exterior unlatch switch 132, each E-latch ECU 24 advances the processing to step S105.

In step S105, each E-latch ECU 24 starts an unlock operation waiting period. Specifically, each E-latch ECU 24 starts measuring an elapsed time from a time point when it is determined in step S101 that the unlatch operation is performed. Then, each E-latch ECU 24 advances the processing to step S106.

In step S106, each E-latch ECU 24 determines whether an unlock request signal is received from the collation ECU 22 via the body ECU 21. When it is determined that the unlock request signal is not received from the collation ECU 22 via the body ECU 21, each E-latch ECU 24 advances the processing to step S107. On the other hand, when each E-latch ECU 24 determines that the unlock request signal is received from the collation ECU 22 via the body ECU 21, the processing advances to step S108.

In step S107, each E-latch ECU 24 determines whether a termination condition, which is a condition for terminating the unlock operation waiting period, is satisfied. Specifically, each E-latch ECU 24 determines that the termination condition is not satisfied when a predetermined time is not elapsed from the time point at which the unlatch operation is detected in step S101. On the other hand, each E-latch ECU 24 determines that the termination condition is satisfied when the predetermined time is elapsed from the time point at which the unlatch operation is detected in step S101. When each E-latch ECU 24 determines that the termination condition is not satisfied, the processing returns to step S106. When each E-latch ECU 24 determines that the termination condition is satisfied, the E-latch ECU 24 temporarily terminates the unlatch routine. As described above, each E-latch ECU 24 continuously determines whether the unlock request signal is received from the collation ECU 22 via the body ECU 21 during the unlock operation waiting period.

In step S108, each E-latch ECU 24 determines whether the unlock request signal received in step S106 is generated by the operation on the vehicle exterior lock sensor 131. When the unlock request signal is not generated by the touch operation on the vehicle exterior lock sensor 131, each E-latch ECU 24 temporarily terminates the unlatch routine. On the other hand, when the unlock request signal is generated by the touch operation on the vehicle exterior lock sensor 131, the E-latch ECU 24 advances the processing to step S103, drives the lock actuator 111 of the door lock device 11 of the corresponding vehicle door 102, 103, 104, or 105, and switches the latch mechanism of the door lock device 11 of the corresponding vehicle door 102, 103, 104, or 105 from the latched state to the unlatched state. Then, the unlatch routine is terminated.

When the processing advances from step S106 to step S108, the door lock ECU 23 also receives the unlock request signal. Even when the unlock request signal is not the unlock request signal generated by the operation on the vehicle exterior lock sensor 131, the door lock ECU 23 switches the door lock device 11 from the locked state to the unlocked state.

According to such an unlatch routine, the door opening control is implemented.

Specifically, when the user operates a certain outside handle grip, as described above, the finger of the user first comes into contact with the vehicle exterior lock sensor 131, and then the vehicle exterior unlatch switch 132 is switched from OFF to ON. When the operation speed of the outside handle grip by the user is slow and the door lock device 11 is switched from the locked state to the unlocked state at the time point when the E-latch ECU 24 corresponding to the vehicle door 102, 103, 104, or 105 provided with the outside handle grip detects the switching of the vehicle exterior unlatch switch 132 from OFF to ON ("Yes" in step S101 and "Yes" in step S102), the E-latch ECU 24 switches the latch mechanism of the door lock device 11 from the latched state to the unlatched state (step S103).

When the operation speed of the outside handle grip by the user is high, the door lock device 11 is not switched from the locked state to the unlocked state at the time point when the E-latch ECU 24 corresponding to the vehicle door 102, 103, 104, or 105 provided with the outside handle grip detects the switching of the vehicle exterior unlatch switch 132 from OFF to ON ("Yes" in step S101, "No" in step S102, and "Yes" in step S104). Therefore, the E-latch ECU 24 starts the unlock operation waiting period (step S105). When the E-latch ECU 24 receives the unlock request signal during the unlock operation waiting period ("Yes" in step S106) and the received unlock request signal is generated by the operation on the vehicle exterior lock sensor 131 ("Yes" in step S108), the E-latch ECU 24 switches the door lock device 11 to the unlatched state (step S103).

On the other hand, when the unlock request signal received during the unlock operation waiting period is not generated by the operation on the vehicle exterior lock sensor 131 ("No" in step S108), the E-latch ECU 24 does not switch the door lock device 11 to the unlatched state. However, in this case, the door lock ECU 23 switches the door lock device 11 from the locked state to the unlocked state.

Although the embodiment disclosed here is described above, this disclosure is not limited to the above embodiment. Various modifications can be made to the embodiment disclosed here without departing from the spirit thereof, and such modifications are also included in the technical scope of the embodiment disclosed here.

For example, in the above embodiment, the pop-up device 12 is provided in each of the vehicle doors 102, 103, 104, and 105, whereas the pop-up device 12 may not be provided. In this case, for example, a vehicle door in an unlatched state may be implemented to automatically pop up by an elastic reaction force of a weather strip provided on the vehicle door.

In the above embodiment, the indicator 17 (direction indicator) and the vehicle interior lock indicator 16 are used as the notification device, whereas the notification device is not limited to the above devices. As the notification device, a device other than the indicator 17 (direction indicator) and the vehicle interior lock indicator 16 may be applied. An operation of the notification device is not limited to the operation described in the above embodiment. For example, the notification device may include the outside door handle illumination 15. In this case, when each E-latch ECU 24 detects that the door lock device of the corresponding vehicle door 102, 103, 104, or 105 is switched from the locked state to the unlocked state, the E-latch ECU 24 executes control such as blinking a light source of the outside door handle illumination 15, and changing a light emission color.

A vehicle door opening device according to this disclosure is a vehicle door opening device that controls a door lock device including a latch mechanism that is switchable between a latched state in which a vehicle door is not allowed to be opened with respect to a vehicle body and an unlatched state in which the vehicle door is allowed to be opened with respect to the vehicle body, and configured to be switchable between a locked state in which switching of the latch mechanism from the latched state to the unlatched state is not allowed and an unlocked state in which the switching of the latch mechanism from the latched state to the unlatched state is allowed. The vehicle door opening device includes:

a first operation member and a second operation member operable by a user from outside of a vehicle;

a lock control device configured to switch the door lock device from the locked state to the unlocked state when an operation on the first operation member is detected while the door lock device is in the locked state; and a latch control device configured to: when an operation on the second operation member is detected while the door lock device is in the unlocked state, switch the latch mechanism from the latched state to the unlatched state; when the operation on the second operation member is detected while the door lock device is in the locked state and when the operation on the first operation member is detected before a predetermined time elapses after the operation on the second operation member is detected, switch the latch mechanism from the latched state to the unlatched state; and, when the operation on the second operation member is detected while the door lock device is in the locked state and when the operation on the first operation member is not detected before the predetermined time elapses after the operation on the second operation member is detected, maintain the latch mechanism in the latched state.

According to the vehicle door opening device in this disclosure, when the operation on the first operation member is detected by the lock control device within the predetermined time after the latch control device detects the operation on the second operation member, the latch control device switches the latch mechanism from the latched state to the unlatched state. According to such a configuration, even when the operation on the second operation member is detected by the latch control device before the lock control device detects the operation on the first operation member, the latch mechanism of the door lock device can be switched from the latched state to the unlatched state (that is, the vehicle door can be opened).

The first operation member and the second operation member may be provided on an outside handle grip of an outside door handle device provided on the vehicle door, the first operation member may be configured to be operated by touching the outside handle grip, and the second operation member may be configured to be operated by gripping the outside handle grip.

According to such a configuration, when the user operates the outside handle grip, the first operation member is first operated, and then the second operation member is operated. Therefore, depending on an operation speed of the outside handle grip by the user, the lock control device can detect the operation on the first operation member before the latch control device detects the operation on the second operation member. Therefore, the latch mechanism of the door lock device can be switched from the latched state to the unlatched state.

The vehicle door opening device according to this disclosure may further includes:

a wireless communication device configured to be wirelessly communicable with a portable control device that is present within a predetermined range from the vehicle; and a collation device configured to determine, based on a signal received from the portable control device via the wireless communication device, whether the portable control device associated with the vehicle is present within the predetermined range from the vehicle.

When the collation device determines that the portable control device associated with the vehicle is present within the predetermined range from the vehicle and the operation on the first operation member is detected, the collation device may transmit, to the lock control device, a first unlock request signal indicating that the first operation member is operated, and the latch control device may be configured to switch the latch mechanism from the latched state to the unlatched state when the lock control device receives the first unlock request signal before the predetermined time elapses after the operation on the second operation member is detected.

The latch control device may detect the operation on the second operation member before the collation device transmits, to the lock control device, the signal indicating that the operation on the first operation member is performed. However, according to such a configuration, even when the operation on the second operation member is detected by the latch control device before the lock control device detects the operation on the first operation member, the latch mechanism of the door lock device can be switched from the latched state to the unlatched state.

A configuration is applicable in which the collation device transmits a second unlock request signal to the lock control device when a signal requesting to switch the door lock device from the locked state to the unlocked state is transmitted from the portable control device, when the lock control device receives the second unlock request signal before the predetermined time elapses after the latch control device detects the operation on the second operation member, the latch control device maintains the latch mechanism in the latched state, and the lock control device switches the door lock device from the locked state to the unlocked state.

According to such a configuration, the latch mechanism of the door lock device can be prevented from being switched to the unlatched state at a time point not intended by the user. For example, when a user A operates the first operation member and the second operation member without carrying the portable control device, the latch control device does not switch the latch mechanism of the door lock device to the unlatched state. Thereafter, when the latch control device switches the latch mechanism of the door lock device to the unlatched state in accordance with an operation of the portable control device by another user B before the predetermined time elapses after the operation on the second operation member is detected, the latch mechanism of the door lock device can be switched to the unlatched state at a time point not intended by the user A. In contrast, according to the above configuration, since the latch control device does not switch the latch mechanism of the door lock device to the unlatched state by the operation of the portable control device, it is possible to prevent the latch mechanism of the door lock device from being switched to the unlatched state at a time point not intended by the user A.

A configuration is applicable in which the latch control device switches the latch mechanism from the latched state to the unlatched state when the operation on the second operation member is detected after the lock control device receives the second unlock request signal before the predetermined time elapses.

When the lock control device switches the door lock device from the locked state to the unlocked state and then detects an operation on the second operation member again, it can be considered that the user has an intention to open the door. Therefore, in such a case, the latch control device switches the door lock device from the locked state to the unlocked state, so that the door lock device can be switched from the locked state to the unlocked state in accordance with the intention of the user.

A configuration is applicable in which the vehicle door opening device further includes a notification device configured to notify the user of whether the door lock device is in the locked state or the unlocked state.

According to such a configuration, the user can recognize whether the door lock device is in the locked state or the unlocked state. In other words, the user can recognize whether the door lock device is switched from the locked state to the unlocked state by the operation on the first operation member by the user himself.

A configuration is applicable in which the predetermined time is 2 seconds or more and 4 seconds or less.

When the predetermined time is too short, the latch control device may not be able to detect that the first operation member is operated. When the predetermined time is 2 seconds or more and 4 seconds or less, it is possible to improve reliability of detection of the operation on the first operation member.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle door opening device that controls a door lock device including a latch mechanism that is switchable between a latched state in which a vehicle door is not allowed to be opened with respect to a vehicle body and an unlatched state in which the vehicle door is allowed to be opened with respect to the vehicle body, and configured to be switchable between a locked state in which switching of the latch mechanism from the latched state to the unlatched state is not allowed and an unlocked state in which the switching of the latch mechanism from the latched state to the unlatched state is allowed, the vehicle door opening device comprising:
    a vehicle exterior lock sensor and a vehicle exterior unlatch switch operable by a user from outside of a vehicle, the vehicle exterior lock sensor and the vehicle exterior unlatch switch being provided on an outside handle grip of an outside door handle device provided on the vehicle door;
    a lock control device configured to switch the door lock device from the locked state to the unlocked state when an operation on the vehicle exterior lock sensor is detected while the door lock device is in the locked state;
    a latch control device configured to:
        when an operation on the vehicle exterior unlatch switch is detected while the door lock device is in the unlocked state, switch the latch mechanism from the latched state to the unlatched state;
        when the operation on the vehicle exterior unlatch switch is detected while the door lock device is in the locked state and when the operation on the vehicle exterior lock sensor is detected before a predetermined time elapses after the operation on the vehicle exterior unlatch switch is detected, switch the latch mechanism from the latched state to the unlatched state; and
        when the operation on the vehicle exterior unlatch switch is detected while the door lock device is in the locked state and when the operation on the vehicle exterior lock sensor is not detected before the predetermined time elapses after the operation on the vehicle exterior unlatch switch is detected, maintain the latch mechanism in the latched state;
    a vehicle exterior wireless communication device provided in the vehicle door and configured to be wirelessly communicable with a portable control device that is present within a predetermined range from the vehicle; and
    a collation device configured to determine, based on a signal received from the portable control device via the vehicle exterior wireless communication device, whether the portable control device associated with the vehicle is present within the predetermined range from the vehicle, wherein
    the lock control device, the latch control device, and the collation device have separate processors in communication with each other,
    when the collation device determines that the portable control device associated with the vehicle is present within the predetermined range from the vehicle and the operation on the vehicle exterior lock sensor is detected, the collation device transmits, to the lock control device, a first unlock request signal indicating that the vehicle exterior lock sensor is operated,
    the latch control device is configured to switch the latch mechanism from the latched state to the unlatched state when the lock control device receives the first unlock request signal before the predetermined time elapses after the operation on the vehicle exterior unlatch switch is detected,
    the collation device transmits a second unlock request signal to the lock control device when a signal requesting to switch the door lock device from the locked state to the unlocked state is transmitted from the portable control device,
    when the lock control device receives the second unlock request signal before the predetermined time elapses after the latch control device detects the operation on the vehicle exterior unlatch switch,
    the latch control device maintains the latch mechanism in the latched state,
    the lock control device switches the door lock device from the locked state to the unlocked state, and
    the latch control device switches the latch mechanism from the latched state to the unlatched state when the operation on the vehicle exterior unlatch switch is detected after the lock control device receives the second unlock request signal before the predetermined time elapses.

2. The vehicle door opening device according to claim 1, wherein
    the vehicle exterior lock sensor is configured to be only operated by touching the outside handle grip by hooking the outside handle grip with a finger of the user, and
    the vehicle exterior unlatch switch is configured to be only operated by gripping the outside handle grip with a hand of the user.

3. The vehicle door opening device according to claim 1, further comprising:
    a notification device configured to notify the user of whether the door lock device is in the locked state or the unlocked state.

4. The vehicle door opening device according to claim 1, wherein
    the predetermined time is 2 seconds or more and 4 seconds or less.

* * * * *